United States Patent
Zhu et al.

(10) Patent No.: US 9,530,301 B1
(45) Date of Patent: Dec. 27, 2016

(54) ELECTRONIC DISK DRIVE APPARATUS

(71) Applicants: Inventec (Pudong) Technology Corporation, Shanghai (CN); INVENTEC CORPORATION, Taipei (TW)

(72) Inventors: Zhi-Feng Zhu, Shanghai (CN); Ying-Xian Han, Shanghai (CN)

(73) Assignees: Invetec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 14/884,780

(22) Filed: Oct. 16, 2015

(30) Foreign Application Priority Data

Sep. 10, 2015 (CN) .......................... 2015 1 0574388

(51) Int. Cl.
| | |
|---|---|
| G08B 5/36 | (2006.01) |
| G08B 3/10 | (2006.01) |
| B65D 5/38 | (2006.01) |
| G08B 21/18 | (2006.01) |
| G06F 1/18 | (2006.01) |

(52) U.S. Cl.
CPC ............. *G08B 21/182* (2013.01); *G06F 1/187* (2013.01); *G08B 3/10* (2013.01); *G08B 5/36* (2013.01)

(58) Field of Classification Search
USPC .................................. 340/593; 720/613, 601
See application file for complete search history.

(56) References Cited

U.S. PATENT DOCUMENTS

| | | | | |
|---|---|---|---|---|
| 3,395,849 A | * | 8/1968 | Gillam | B65D 5/38 229/125.125 |
| 5,421,452 A | * | 6/1995 | Hybiske | B65D 85/548 206/308.1 |
| 6,181,663 B1 | * | 1/2001 | Kakuta | G11B 17/056 720/610 |
| 6,392,975 B2 | * | 5/2002 | Arai | G11B 17/056 720/610 |
| 6,557,700 B1 | * | 5/2003 | Wharton | B65D 5/38 206/308.1 |
| 6,578,935 B1 | * | 6/2003 | Garretson | G11B 33/0444 312/9.16 |
| 7,051,344 B2 | * | 5/2006 | Mizuno | G11B 17/226 720/601 |
| 7,448,051 B2 | * | 11/2008 | Nelson | B41J 3/4071 369/292 |

(Continued)

*Primary Examiner* — Fekadeselassie Girma
(74) *Attorney, Agent, or Firm* — CKC & Partners Co., Ltd.

(57) ABSTRACT

An electronic apparatus includes a casing, a first sliding tray module, a second sliding tray module, a switch module and a main board. The first sliding tray module includes a first belt unit, a baffle is disposed on one end of the first belt unit. The switch module includes an elastic piece and a switch. The first sliding tray module and/or the second sliding tray module slide/slides in or out to make the elastic piece and the baffle touched or untouched. The switch generates a switch signal according to whether the elastic piece and the baffle being touched or untouched. While the elastic piece and the baffle are untouched, the main board is configured to generate a detecting time according to the switch signal, and while the detecting time is longer than a safe time, the main board generates a warning signal through the electronic apparatus.

10 Claims, 4 Drawing Sheets

(56) References Cited

U.S. PATENT DOCUMENTS

| | | | |
|---|---|---|---|
| 2006/0285268 A1* | 12/2006 | Wang | H05F 3/02 |
| | | | 361/221 |
| 2008/0028418 A1* | 1/2008 | Fukasawa | G11B 17/056 |
| | | | 720/608 |
| 2010/0058371 A1* | 3/2010 | Nishioka | G11B 17/10 |
| | | | 720/601 |
| 2010/0140338 A1* | 6/2010 | Butler | B42D 5/025 |
| | | | 229/300 |
| 2011/0132779 A1* | 6/2011 | Loughman | B65D 5/38 |
| | | | 206/1.5 |

\* cited by examiner

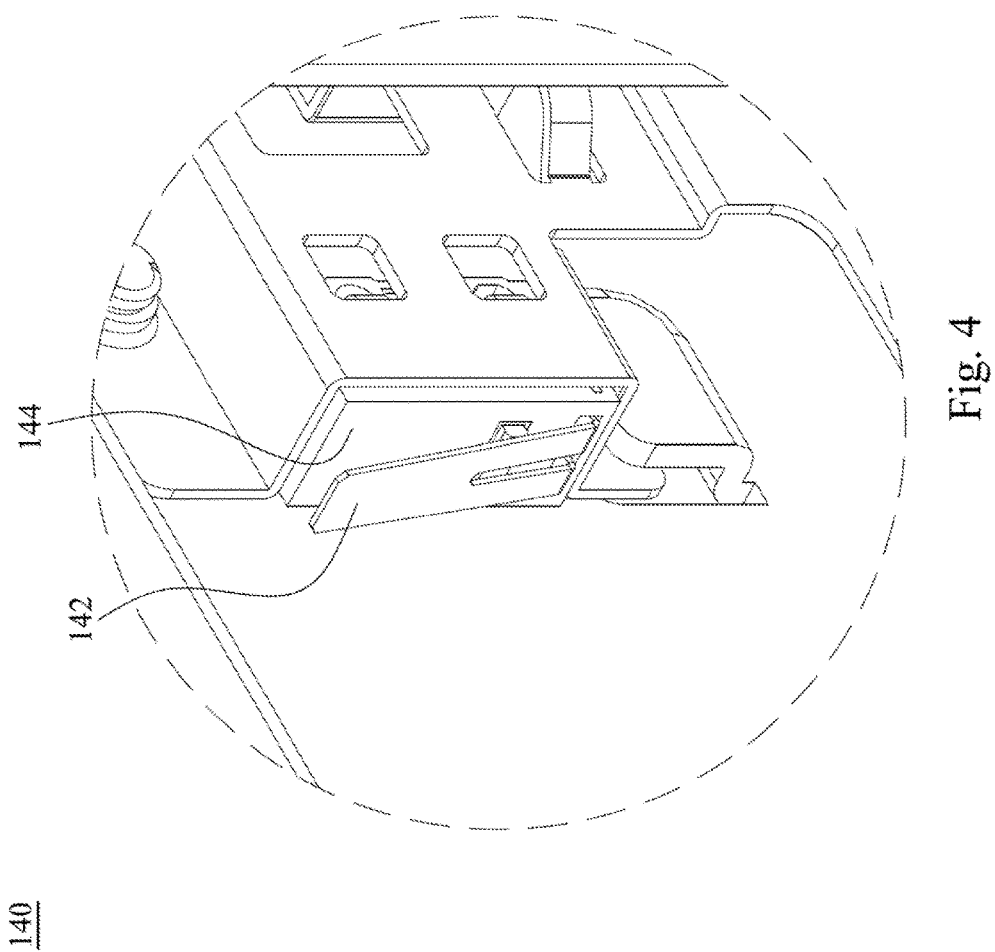

ELECTRONIC DISK DRIVE APPARATUS

RELATED APPLICATIONS

This application claims priority to Chinese Application Serial Number 201510574388.0, filed on Sep. 10, 2015, which is herein incorporated by reference.

BACKGROUND

Technical Field

The present disclosure relates to an electronic apparatus. More particularly, the present disclosure relates to the electronic apparatus, which can output a warning signal.

Description of Related Art

In order to store a large amount of data, the present apparatuses, such as servers or cloud systems, inevitably have storage apparatuses disposed therein. In practical application, the storage apparatuses are usually set up to be movable for convenience of maintaining or detecting, i.e., users or staffs in a machine room can maintain or detect the servers or the cloud systems, which are still under normal operation, through pulling or pushing the servers or the cloud systems out from a casing thereof temporarily.

However, once the storage apparatuses are pulling or pushing out form the casing thereof, heat of the storage apparatuses will not be dissipated by fans disposed in the servers or the cloud systems, and the storage apparatuses will be overheated and malfunction. The traditional solution is to manually timing or estimating the time of the storage apparatuses pulled/pushed out from the casing, and pulling/pushing the storage apparatuses back to the original disposed position before the storage apparatuses are overheated and malfunction. However, the method is inconvenient and usually causes misjudgments on timing or estimating.

SUMMARY

The following presents a simplified summary of the disclosure in order to provide a basic understanding to the reader. This summary is not an extensive overview of the disclosure and it does not identify key/critical components of the present disclosure or delineate the scope of the present disclosure. Its sole purpose is to present some concepts disclosed herein in a simplified form as a prelude to the more detailed description that is presented later.

In one aspect, the present disclosure is to provide an electronic apparatus. The electronic apparatus includes a casing, a first sliding tray module, a second sliding tray module, a switch module and a main board. The casing includes a sliding rail. The first sliding tray module includes a first hard disk module and a first belt unit, in which one end of the first belt unit is connected with the first hard disk module, and the first sliding tray module is able to slide on the sliding rail accompanying with the first belt unit along an inward direction or an outward direction relative to the casing, and a baffle is disposed on another end of the first belt unit. The second sliding tray module includes a second hard disk module and a second belt unit, wherein one end of the second belt unit is connected with the second hard disk module, and the second sliding tray module is able to slide on the sliding rail accompanying with the first belt unit along the inward direction or the outward direction relative to the casing. The switch module is disposed on the outward direction of the first sliding tray module and the second sliding tray module, in which the switch module includes an elastic piece and a switch. The first sliding tray module and/or the second sliding tray module slide/slides in or out to make the elastic piece and the baffle touched or untouched. The switch is configured to generate a switch signal according to whether the elastic piece and the baffle being touched or untouched. The main board is disposed on the casing and electrically coupled with the switch module, in which while the elastic piece and the baffle are untouched, the main board is configured for generating a detecting time according to the switch signal, and while the detecting time is longer than a safe time, the main board generates a warning signal through the electronic apparatus.

The present disclosure relates to an electronic apparatus. More particularly, the present disclosure relates to the electronic apparatus, which can output a warning signal. By applying the warning signal disclosed in the present disclosure, staffs in a machine room can instantly get information about whether the sliding tray module is pulled/pushed out from the casing, and whether the time of the storage apparatuses pulled/pushed out from the casing is too long to cause elements in the hard disk module overheated and crashed even under noisy circumstances in the machine room.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 4 is a schematic diagram of the elastic piece and the baffle being untouched in the electronic apparatus of FIG. 1.

DETAILED DESCRIPTION

Figure 1:
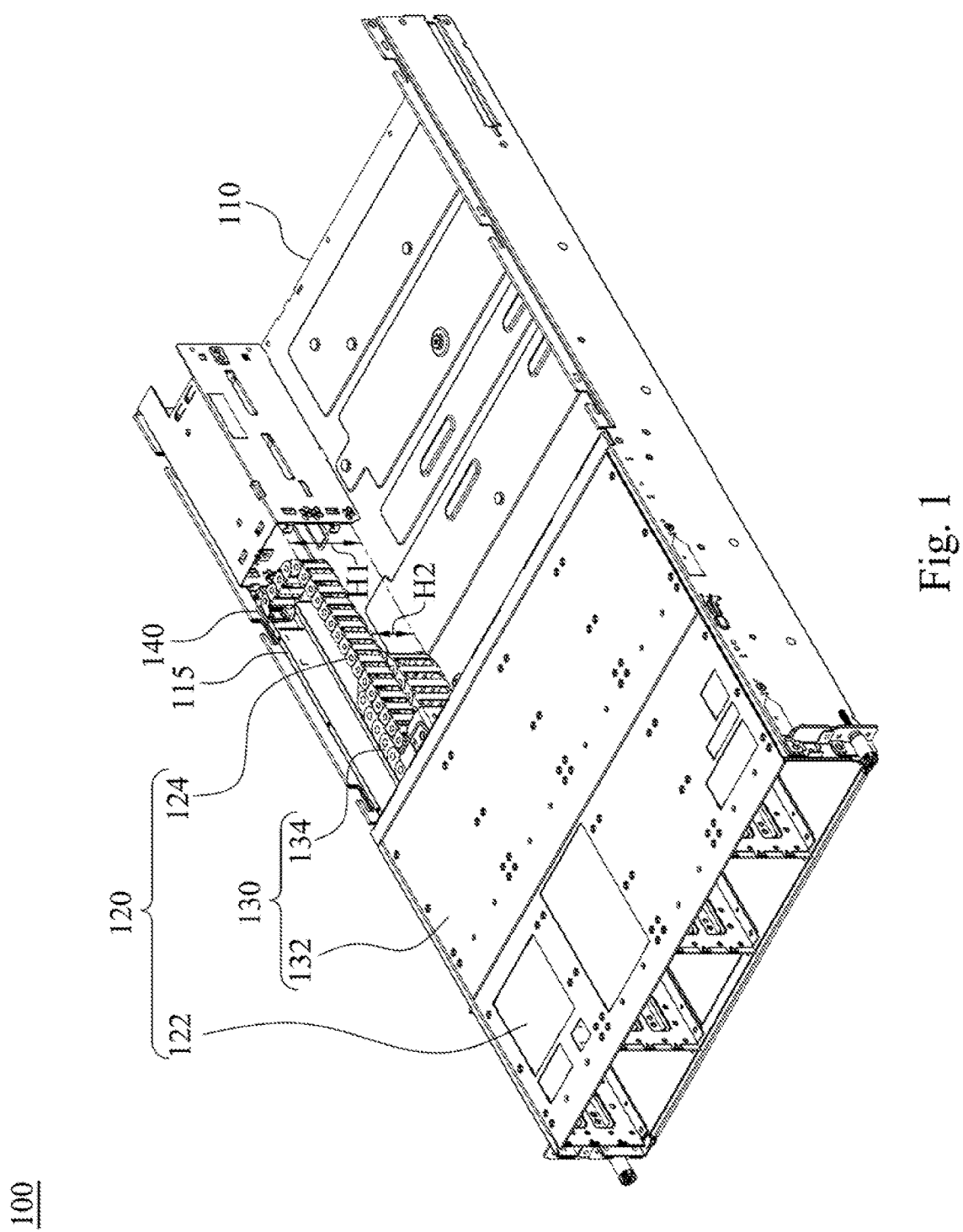
FIG. 1 is a schematic diagram of an electronic apparatus in accordance with one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Reference is made first to FIG. 1. FIG. 1 is a schematic diagram of an electronic apparatus 100 in accordance with one embodiment of the present disclosure. The electronic apparatus 100 includes a casing 110, a first sliding tray module 120, a second sliding tray module 130, a switch module 140 and a main board 150 (not depicted in FIG. 1). The electronic apparatus 100 can be a server, a personal computer, a cloud apparatus or any electronic apparatus having operation function, and in practical application, the main board 150 can further include other operating units (not depicted in FIG. 1), such as central processing units (CPUs) and arithmetic logic units (ALUs), and the present disclosure is not limited in this regard.

In some embodiments, the electronic apparatus 100 further includes fan units (not depicted in FIG. 1). The fan units are configured to control the temperature of the electronic apparatus 100 through different fan speeds, and prevent the electronic apparatus 100 from being overheated and malfunctioning. For example, while the electronic apparatus 100 is standby, the fan units utilize the lowest fan speed (or even do not be enabled) to keep the temperature of elements in the electronic apparatus 100 at a constant temperature, such as 50° C. While the electronic apparatus 100 is operating at a high speed, the fan units should also utilize high fan speed to keep the temperature of elements in the electronic apparatus 100 at the constant temperature, such as 50° C.

The casing 110 includes a sliding rail 115.

The first sliding tray module 120 includes a first hard disk module 122 and a first belt unit 124, in which one end of the first belt unit 124 is connected with the first hard disk module 122, and the first sliding tray module 120 is able to slide on the sliding rail 115 accompanying with the first belt unit 124 along an inward direction or an outward direction relative to the casing 110, and a baffle 126 (depicted in FIG. 3, and the detailed description will be shown in later paragraphs) is disposed on another end of the first belt unit 124.

The second sliding tray module 130 includes a second hard disk module 132 and a second belt unit 134, wherein one end of the second belt unit 134 is connected with the second hard disk module 132, and the second sliding tray module 130 is able to slide on the sliding rail 115 accompanying with the first belt unit 134 along the inward direction or the outward direction relative to the casing 110.

Figure 2:
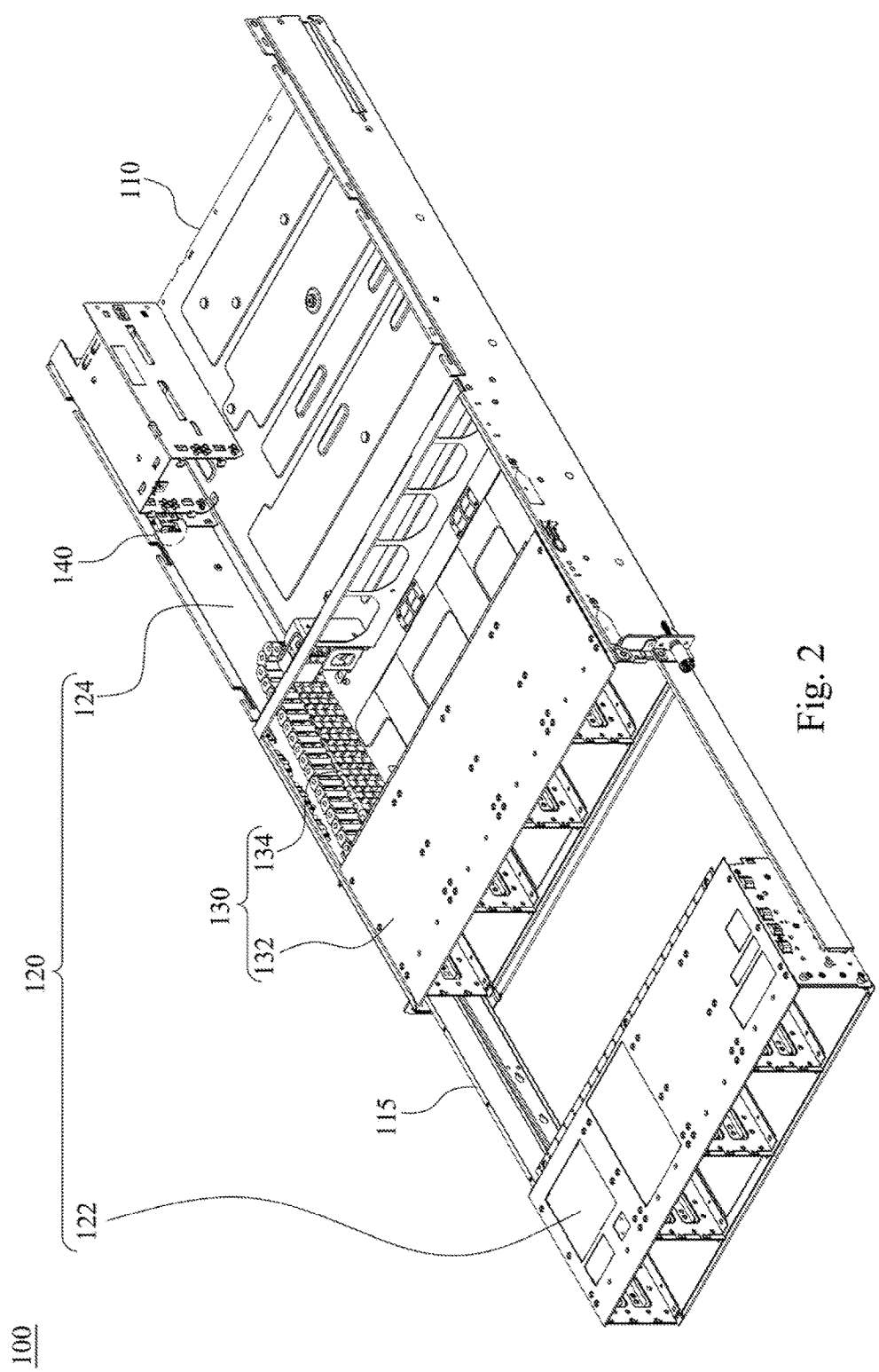
FIG. 2 is a schematic diagram of the first sliding tray module and the second sliding tray module in the electronic apparatus of FIG. 1.

For further explanation, reference is made to FIG. 1 and FIG. 2. FIG. 2 is a schematic diagram of the first sliding tray module 120 and the second sliding tray module 130 in the electronic apparatus 100 of FIG. 1. As shown in FIG. 2, the first belt unit 124 is disposed a first height H1 away from a bottom surface of the casing 110, and the second belt unit 134 is disposed a second height H2 away from the bottom surface of the casing 110, and the first height H1 is different from the second height H2. Therefore, while the first sliding tray module 120 and the second sliding tray module 130 is slid out from the casing 110, the first belt unit 124 and the second belt unit 134 are moving on different surfaces, i.e., the first belt unit 124 and the second belt unit 134 will not influence each other.

In addition, in some embodiments, the first hard disk module 122 and the second hard disk module 132 can further include storage units (not depicted in FIG. 1), and in practical application, the storage units can be hard disks, but the present disclosure is not limited in this regard. The storage units are configured to store data of the electronic apparatus 100, e.g. store the data operated by the operating units (not depicted in FIG. 1) in the main board 150. In practical application, the storage units are usually set up to be movable for convenience of maintaining or detecting, i.e., users or staffs in a machine room can maintain or detect the electronic apparatus 100, which are still under normal operation, through pulling or pushing the electronic apparatus 100 out from the casing 110 temporarily, as shown in FIG. 2.

Reference is also made to FIG. 1, the switch module 140 is disposed on the outward direction of the first sliding tray module 120 and the second sliding tray module 130, in which the switch module 140 includes an elastic piece 142 and a switch 144. The first sliding tray module 120 and/or the second sliding tray module 130 slides in or out to make the elastic piece 142 and the baffle 126 touched or untouched. The switch 144 is configured to generate a switch signal according to whether the elastic piece 142 and the baffle 126 being touched or untouched.

Figure 3:
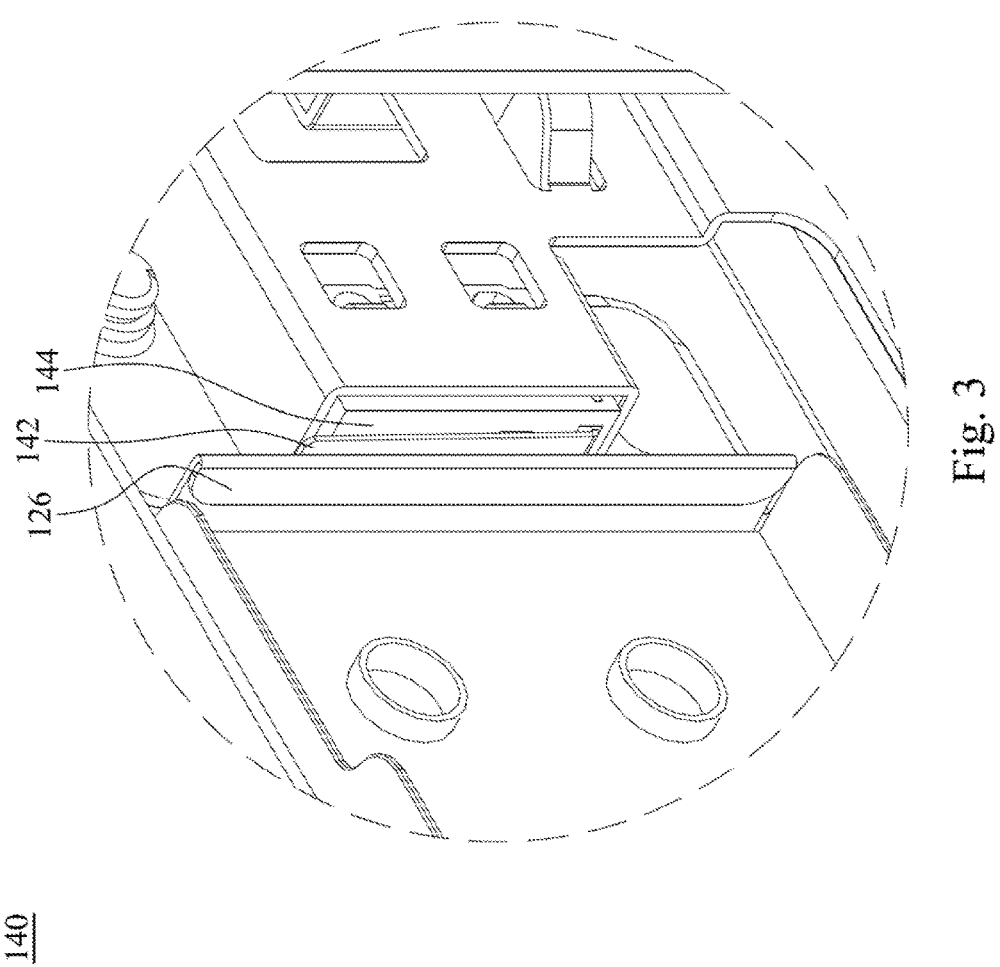
FIG. 3 is a schematic diagram of the elastic piece and the baffle being touched in the electronic apparatus of FIG. 1.

For further explanation, reference is made to FIG. 3 and FIG. 4. FIG. 3 is a schematic diagram of the elastic piece 142 and the baffle 126 being touched in the electronic apparatus of FIG. 1. FIG. 4 is a schematic diagram of the elastic piece 142 and the baffle 126 being untouched in the electronic apparatus of FIG. 1. As shown in FIG. 3, while the first sliding tray module 120 or the second sliding tray module 130 slides in to make the elastic piece 142 and the baffle 126 touched, the switch 144 generates the switch signal, such as enabled signal or short signal, according to the elastic piece 142 and the baffle 126 being touched. As shown in FIG. 4, while the first sliding tray module 120 or the second sliding tray module 130 slides out to make the elastic piece 142 and the baffle 126 untouched, the switch 144 generates the switch signal, such as disabled signal or open signal, according to the elastic piece 142 and the baffle 126 being untouched.

It should be noted that, the first sliding tray module 120 is disposed in front of the second sliding tray module 130, so if the second sliding tray module 130 is needed to slide out, the first sliding tray module 120 should slide out first. Besides, while the first sliding tray module 120 and the second sliding tray module 130 slide out, the distance that the first sliding tray module 120 slides is longer than the distance that the second sliding tray module 130 slides. Therefore, in this embodiment, the baffle 126 is disposed on the first sliding tray module 120, and thus while the first sliding tray module 120 slides out, the switch 144 can instantly generate the switch signal according to the elastic piece 142 and the baffle 126 being untouched.

The main board 150 is disposed on the casing 110 and electrically coupled with the switch module 140, in which while the elastic piece 142 and the baffle 126 are untouched, the main board 150 is configured for generating a detecting time according to the switch signal, and while the detecting time is longer than a safe time, such as 10 seconds or 15 seconds, the main board 150 generates a warning signal through the electronic apparatus 100. Therefore, by applying the warning signal disclosed in the present disclosure, staffs in the machine room can instantly get information about whether the sliding tray module is pulled/pushed out from the casing, and whether the time of the storage apparatuses pulled/pushed out from the casing is too long to cause elements in the hard disk module overheated and crashed even under noisy circumstances in the machine room.

In some embodiments, the main board 150 is coupled with a first back board (not depicted, disposed in the first hard disk module 122) and a second back board (not depicted, disposed in the second hard disk module 132) through the another end of the first belt unit 124 and the second belt unit 134, and while the first sliding tray module 120 and/or the second sliding tray module 130 slide/slides out from the casing 110, the main board 150 monitors a first temperature of at least one first temperature sensing unit (not depicted) on the first back board, and a second temperature of at least one second temperature sensing unit (not depicted) on the second back board, and the main board 150 controls working statuses of the electronic apparatus 100 according to the detecting time and a maximum between the first temperature and the second temperature.

For example, the first sensing unit and the second sensing unit can be thermometers, radiation sensing meters, thermosensitive circuits or other equivalent temperature sensing units. While the first sliding tray module 120 or the second sliding tray module 130 slides out from the casing 110, the fan units (not depicted) can not effectively dissipate the heat of the first back board and the second backboard, so the first back board and the second back board might be overheated while the first sliding tray module 120 or the second sliding tray module 130 slides out from the casing 110. In practical application, the first sensing unit and the second sensing unit can be singular or plural, and the present disclosure is not limited in this regard. For example, the first temperature measured by the first temperature sensing unit (not depicted) is 80° C., and the second temperature measured by the second temperature sensing unit (not depicted) is 60° C., and the main board 150 controls working statuses of the electronic apparatus 100 (such as saving data, shutting down programs or turning off the electronic apparatus 100) according to the detecting time (such as 10 seconds) and a maximum (80° C. in the example) between the first temperature (80° C.) and the second temperature (60° C.).

In some embodiments, the electronic apparatus 100 can further include a light emitting unit (not depicted) disposed on bilateral front lobes of the electronic apparatus 100 and electrically coupled with the main board 150, in which the warning signal is a light signal outputted by the light emitting unit. For further explanation, while the detecting time (such as 5 seconds) is shorter than the safe time (such as 10 seconds), the light emitting unit outputs a first light signal, and while the detecting time (such as 15 seconds) is longer than the safe time (such as 10 seconds), the light emitting unit outputs a second light signal, and the first light signal is different from the second light signal. For example, the first light signal and the second light signal can respectively be green light and yellow light, or blue light and red light, or blue light and yellow light or any visible light that can be recognized by human eyes. In one example, while the detecting time (such as 5 seconds) is shorter than the safe time (such as 10 seconds), the light emitting unit outputs the first light signal as green light, and while the detecting time (such as 15 seconds) is longer than the safe time (such as 10 seconds), the light emitting unit outputs the second light signal as yellow light.

In some embodiments, during a first period after the detecting time is longer than the safe time, the light emitting unit outputs the first light signal with a first light frequency. After the first period after the detecting time is longer than the safe time, the light emitting unit outputs the second light signal with a second light frequency, and the first light frequency is different from the second light frequency.

For example, the first period can be 10 seconds, 20 seconds or any other time periods, and the first light frequency can be 0.5 Hz, 1 Hz or any other frequencies. That is to say, during the first period (such as 20 seconds) after the detecting time is longer than the safe time (such as 10 seconds), the light emitting unit flickers the green light at 1 Hz. In this example, after the first period after the detecting time is longer than the safe time, the light emitting unit outputs the second light signal with the second light frequency, and the first light frequency is different from the second light frequency. For example, the second light frequency can be 2 Hz, 4 Hz or any other frequencies different from the first light frequency. Therefore, after the first period (20 seconds) after the detecting time is longer than the safe time (10 seconds), the light emitting unit flickers the yellow light at 4 Hz.

In addition, in some embodiments, while the untouched elastic piece 144 and the baffle 126 are changed to be touched, the light emitting unit keeps outputting the second light signal. For example, while the untouched elastic piece 144 and the baffle 126 are changed to be touched, the light emitting unit keeps outputting the yellow light. It should be noted that, if the yellow light is originally flickered at the second light frequency (such as 4 Hz), then the light emitting unit keeps outputting the yellow light with the second light frequency here. Therefore, staffs in the machine room can prevent from pulling/pushing out the sliding tray module from the casing again before the heat of the electronic apparatus 100 is well dissipated.

In some embodiments, the electronic apparatus 100 can further include a buzzer (not depicted), wherein the warning signal is an acoustic signal outputted by the buzzer. For further explanation, while the detecting time is shorter than the safe time, the buzzer outputs a first acoustic signal with a first acoustic intensity (such as 50 dB) or a first acoustic frequency (such as 500 Hz), and while the detecting time is longer than the safe time, the buzzer outputs a second acoustic signal with a second acoustic intensity (such as 60 dB) or a second acoustic frequency (such as 600 Hz).

The present disclosure relates to an electronic apparatus. More particularly, the present disclosure relates to the electronic apparatus, which can output a warning signal. By applying the warning signal disclosed in the present disclosure, staffs in a machine room can instantly get information about whether the sliding tray module is pulled/pushed out from the casing, and whether the time of the storage apparatuses pulled/pushed out from the casing is too long to cause elements in the hard disk module overheated and crashed even under noisy circumstances in the machine room.

The above illustrations include exemplary operations, but the operations are not necessarily performed in the order shown. Operations may be added, replaced, changed order, and/or eliminated as appropriate, in accordance with the spirit and scope of various embodiments of the present disclosure.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic apparatus, comprising:
    a casing, comprising a sliding rail; and
    a first sliding tray module, comprising a first hard disk module and a first belt unit, wherein one end of the first belt unit is connected with the first hard disk module, and the first sliding tray module is able to slide on the sliding rail accompanying with the first belt unit along an inward direction or an outward direction relative to the casing, and a baffle is disposed on another end of the first belt unit;
    a second sliding tray module, comprising a second hard disk module and a second belt unit, wherein one end of the second belt unit is connected with the second hard disk module, and the second sliding tray module is able to slide on the sliding rail accompanying with the first belt unit along the inward direction or the outward direction relative to the casing;
    a switch module, disposed on the outward direction of the first sliding tray module and the second sliding tray module, wherein the switch module comprises:
        an elastic piece, wherein the first sliding tray module and/or the second sliding tray module slide/slides in or out to make the elastic piece and the baffle touched or untouched; and
        a switch, configured to generate a switch signal according to whether the elastic piece and the baffle being touched or untouched; and
    a main board, disposed on the casing and electrically coupled with the switch module, wherein while the elastic piece and the baffle are untouched, the main board is configured for generating a detecting time according to the switch signal, and while the detecting time is longer than a safe time, the main board generates a warning signal through the electronic apparatus.

2. The electronic apparatus of claim 1, wherein the first belt unit is disposed a first height away from a bottom surface of the casing, and the second belt unit is disposed a second height away from the bottom surface of the casing, and the first height is different from the second height.

3. The electronic apparatus of claim 1, wherein the main board is coupled with a first back board and a second back board through the another end of the first belt unit and the second belt unit, and while the first sliding tray module and/or the second sliding tray module slide/slides out from the casing, the main board monitors a first temperature of at least one first temperature sensing unit on the first back board, and a second temperature of at least one second temperature sensing unit on the second back board, and the main board controls working statuses of the electronic apparatus according to the detecting time and a maximum between the first temperature and the second temperature.

4. The electronic apparatus of claim 1, further comprising a light emitting unit, wherein the warning signal is a light signal outputted by the light emitting unit.

5. The electronic apparatus of claim 4, wherein while the detecting time is shorter than the safe time, the light emitting unit outputs a first light signal, and while the detecting time is longer than the safe time, the light emitting unit outputs a second light signal, and the first light signal is different from the second light signal.

6. The electronic apparatus of claim 5, wherein during a first period after the detecting time is longer than the safe time, the light emitting unit outputs the first light signal with a first light frequency.

7. The electronic apparatus of claim 5, wherein after the first period after the detecting time is longer than the safe time, the light emitting unit outputs the second light signal with a second light frequency, and the first light frequency is different from the second light frequency.

8. The electronic apparatus of claim 5, wherein while the untouched elastic piece and the baffle are changed to be touched, the light emitting unit keeps outputting the second light signal.

9. The electronic apparatus of claim 1, further comprising a buzzer, wherein the warning signal is an acoustic signal outputted by the buzzer.

10. The electronic apparatus of claim 9, wherein while the detecting time is shorter than the safe time, the buzzer outputs a first acoustic signal with a first acoustic intensity or a first acoustic frequency, and while the detecting time is longer than the safe time, the buzzer outputs a second acoustic signal with a second acoustic intensity or a second acoustic frequency.

* * * * *